(12) United States Patent
Inoue et al.

(10) Patent No.: US 12,247,840 B2
(45) Date of Patent: Mar. 11, 2025

(54) SYSTEMS AND METHODS FOR GENERATING FUEL EFFICIENCY SCORE BASED ON CELL PHONE SENSOR DATA

(71) Applicant: Allstate Insurance Company, Northbrook, IL (US)

(72) Inventors: Satoru Inoue, Chicago, IL (US); Jordan Nelson, Naperville, IL (US); Jacob Kruse, Northbrook, IL (US)

(73) Assignee: Allstate Insurance Company, Northbrook, IL (US)

(*) Notice: Subject to any disclaimer, the term of this patent is extended or adjusted under 35 U.S.C. 154(b) by 0 days.

(21) Appl. No.: 17/829,587

(22) Filed: Jun. 1, 2022

(65) Prior Publication Data
US 2023/0392940 A1    Dec. 7, 2023

(51) Int. Cl.
*G01C 21/34* (2006.01)
*B60W 30/18* (2012.01)
*G07C 5/00* (2006.01)
*G07C 5/08* (2006.01)

(52) U.S. Cl.
CPC ... *G01C 21/3469* (2013.01); *B60W 30/18109* (2013.01); *B60W 2510/0638* (2013.01); *B60W 2510/18* (2013.01)

(58) Field of Classification Search
None
See application file for complete search history.

(56) References Cited

U.S. PATENT DOCUMENTS

| | | | |
|---|---|---|---|
| 5,913,917 A * | 6/1999 | Murphy | B60R 16/0232 701/123 |
| 9,527,515 B2 | 12/2016 | Hunt et al. | |
| 9,865,018 B2 | 1/2018 | Bowne et al. | |
| 9,889,857 B2 | 2/2018 | Chauncey et al. | |
| 10,643,477 B2 | 5/2020 | Hodges et al. | |
| 2015/0356635 A1* | 12/2015 | Thurston | B60Q 9/00 705/306 |
| 2016/0253924 A1* | 9/2016 | Kwak | G07C 5/02 701/123 |

(Continued)

FOREIGN PATENT DOCUMENTS

WO    WO-2016184497 A1    11/2016

OTHER PUBLICATIONS

International Search Report and The Written Opinion of The International Searching Authority for International Application No. PCT/US2023/023824 dated Aug. 25, 2023 (12 pages).

*Primary Examiner* — Aniss Chad
*Assistant Examiner* — Madison R. Inserra
(74) *Attorney, Agent, or Firm* — Akerman LLP (57) ABSTRACT

Implementations claimed and described herein provide systems and methods for determining fuel efficiency based on sensor data from a mobile device. In one implementation, sensor data from a mobile device is collected. The sensor data includes a dataset that reflects a last trip on a vehicle by the mobile device, wherein the sensor data is collected from at least one of global position system (GPS) data and micro-electro-mechanical system (MEMS) sensor data of the mobile device. Driving events comprising at least one of one or more braking events, one or more speeding events, and one or more acceleration events are determined based on the sensor data. A fuel consumption prediction is predicted via a trained prediction model based on the driving events.

18 Claims, 7 Drawing Sheets

(56) References Cited

U.S. PATENT DOCUMENTS

| | | |
|---|---|---|
| 2017/0323244 A1 | 11/2017 | Rani et al. |
| 2019/0066535 A1* | 2/2019 | Pifko .................... G09B 19/167 |
| 2019/0145789 A1* | 5/2019 | Li ....................... G01C 21/3469 |
| | | 701/123 |
| 2019/0168767 A1* | 6/2019 | Gaither ................. G09B 19/167 |
| 2019/0311559 A1* | 10/2019 | Bigio .................... G07C 5/0841 |
| 2021/0319637 A1 | 10/2021 | Tammali et al. |
| 2021/0348934 A1* | 11/2021 | Gaither ............. B60W 60/0025 |
| 2022/0187087 A1* | 6/2022 | Leung ................... B60W 40/09 |
| 2022/0210621 A1* | 6/2022 | Sankaran ............... G07C 5/008 |

* cited by examiner

SYSTEMS AND METHODS FOR GENERATING FUEL EFFICIENCY SCORE BASED ON CELL PHONE SENSOR DATA

FIELD

Aspects of the presently disclosed technology relate generally to determining a fuel efficiency score and more particularly to using cell phone sensor data to generate a fuel efficiency score.

BACKGROUND

Fuel efficiency can typically be determined by collected fuel consumption data as well as ground truth data about driving and vehicle attributes. For example, such data may be collected by On-Board Diagnostic System Information (OBDII) devices. In some instances, the data may be collected by an integrated system of a vehicle. However, such data may not be readily available for drivers shortly after a trip. As such, drivers cannot make better driving decisions, learn about possible cost savings associated with their last trip, and form better driving habits effectively. With these observations in mind, among others, various aspects of the present disclosure were conceived and developed.

SUMMARY

Implementations described and claimed herein address the foregoing by providing systems and methods for determining a fuel efficiency score based on cell phone sensor data. Users carry their mobile phones almost everywhere, especially while in their cars. In one implementation, driving events and behaviors are obtained by a mobile software development kit (SDK) whereby sensors in the associate mobile device record and capture driving events and behaviors during a trip in a vehicle. The sensor data from a mobile device is collected and includes a dataset that reflects the last trip on a vehicle by the mobile device. The sensor data is collected from at least one of global position system (GPS) data and micro-electro-mechanical system (MEMS) sensor data of the mobile device. Driving events may comprise at least one of one or more braking events, one or more speeding events, and one or more acceleration events are determined based on the sensor data. A fuel consumption prediction is predicted via a trained prediction model based on the driving events.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed descriptions are to be regarded as illustrative in nature and not limiting.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Disclosed are systems, apparatuses, methods, non-transitory computer-readable media, and circuits for determining a fuel efficiency score. According to at least one example, a method may include obtaining sensor data from a mobile device. In some examples, the sensor data includes a dataset that reflects a last trip on a vehicle by the mobile device.

In some examples, the method may include determining driving events comprising at least one of one or more breaking events, one or more speeding events, and one or more acceleration events based on the sensor data or determining there are no notable driving events. The method may further include generating, via a learned prediction model, a fuel efficiency score based on the determined driving events.

A system can include one or more processors and at least one computer-readable storage medium storing instructions which, when executed by the one or more processors, cause the one or more processors to obtain sensor data from a mobile device. A non-transitory computer-readable storage medium having stored therein instructions which, when executed by a computing system, cause the computing system to obtain sensor data from a mobile device. In some examples, the sensor data includes a dataset that reflects a last trip on a vehicle by the mobile device.

The instructions may further cause the one or more processors to determine driving events comprising at least one of one or more breaking events, one or more speeding events, and one or more acceleration events based on the sensor data. The instructions may further cause the one or more processors to generate, via a learned prediction model, a fuel efficiency score based on the determined driving events.

As noted above, cell phone sensor data, such as those extracted from GPS and MEMS sensors, may be used as inputs to determine the amount of fuel used during a car trip and determine driving behaviors that lead to wasting fuel during each trip. A prediction model may be trained by a set of collected trip fuel consumption data, simultaneously collected sensor data, and ground truth data regarding driving and vehicle attributes. The training prediction model predicts a fuel efficiency score, a fuel consumption prediction, and/or a fuel wasted prediction based on sensor data from the mobile device collected from being in the vehicle during a trip.

The disclosed technology addresses the need in the art for near-real-time predictions of fuel consumption and possible fuel waste after a trip. Furthermore, based on such predictions, users may also learn more granular information regarding their trip, such as whether they need to improve their breaking and acceleration driving habits. Hard braking, high speeding, and sudden acceleration are a few ways that would waste fuel. As such, obtaining sensor data captured on the mobile device that correlates to driving events while the mobile device is in the vehicle may replace the need to obtain such information from the vehicle. For example, conventional technology may rely solely on an On-Board Diagnostic II (OBDII) device that collects data from the vehicle. Such a process may be more laborious and incremental than that of the present disclosure.

Figure 1:
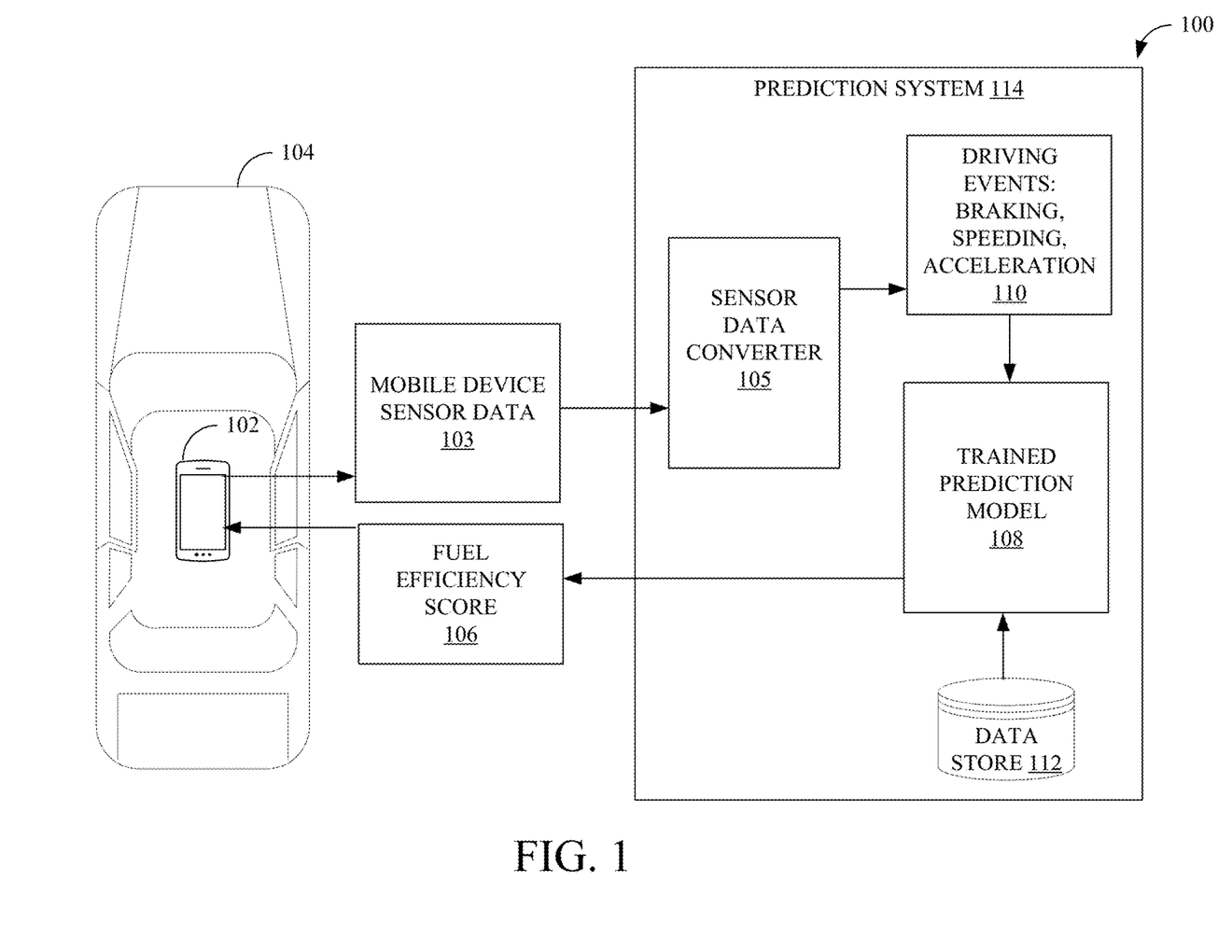
FIG. 1 illustrates an example diagram showing driving events based on mobile device sensor data for determining fuel efficiency.

To begin a detailed description of an example diagram showing driving events obtained from a mobile device determines an efficiency score, reference is made to FIG. 1. A mobile device 102 may collect mobile device sensor data 103 based on movement in a moving vehicle 104 during a trip. The mobile device sensor data 103 may be collected from a global position system (GPS) and micro-electromechanical system (MEMS) sensors on the mobile device 102. The mobile device sensor data 103 from the mobile device 102 for the trip in the vehicle 104 may be sent to a prediction system 114 to calculate a fuel efficiency score 106. The prediction system 114 may comprise a remote processor, partially comprise the remote processor and use one or more processor on the mobile device 102, or fully calculate the fuel efficiency score 106 on one or more processors on the mobile device 102. If the prediction system 114 is remote, data sent to and from a mobile application may be via an application programming interface (API).

The fuel efficiency score 106 may be calculated based on a trained prediction model 108. The trained prediction model 108 may receive driving event 110 such as sensor data associated with braking, speeding, and accelerating as inputs. As mentioned previously, braking, speeding, and accelerating events may cause fuel waste. The driving event 110 may be determined by a sensor data converter 105 that converts the mobile device sensor data 103 into driving event 110 or the driving event 110 may be converted data processed at the mobile device 102. Thresholds are set by the sensor data converter 105 with respect to speed and acceleration captured by the MEMS sensors on the mobile device 102. Then, by inputting such driving events 110 into the trained prediction model 108, the fuel efficiency score 106 may be outputted as, for example, a numerical or similar value that represents a percentage out of 100%, which would indicate any lowered efficiency based on such driving events 110. The fuel efficiency score 106 would be likened to a numerical or similar value representing 100% when no such driving events occur. The fuel efficiency score 106 could be out of 10, 100, etc.

In some examples, the fuel efficiency score 106 is based on a calculation of a fuel wasted prediction. The fuel wasted prediction may be determined based on comparing fuel consumption without the driving events and fuel consumption with the driving events. The resulting difference is the amount of fuel wasted and a calculation of the amount of fuel wasted per unit distance may be a determinative factor in calculating the fuel efficiency score 106.

Figure 2:
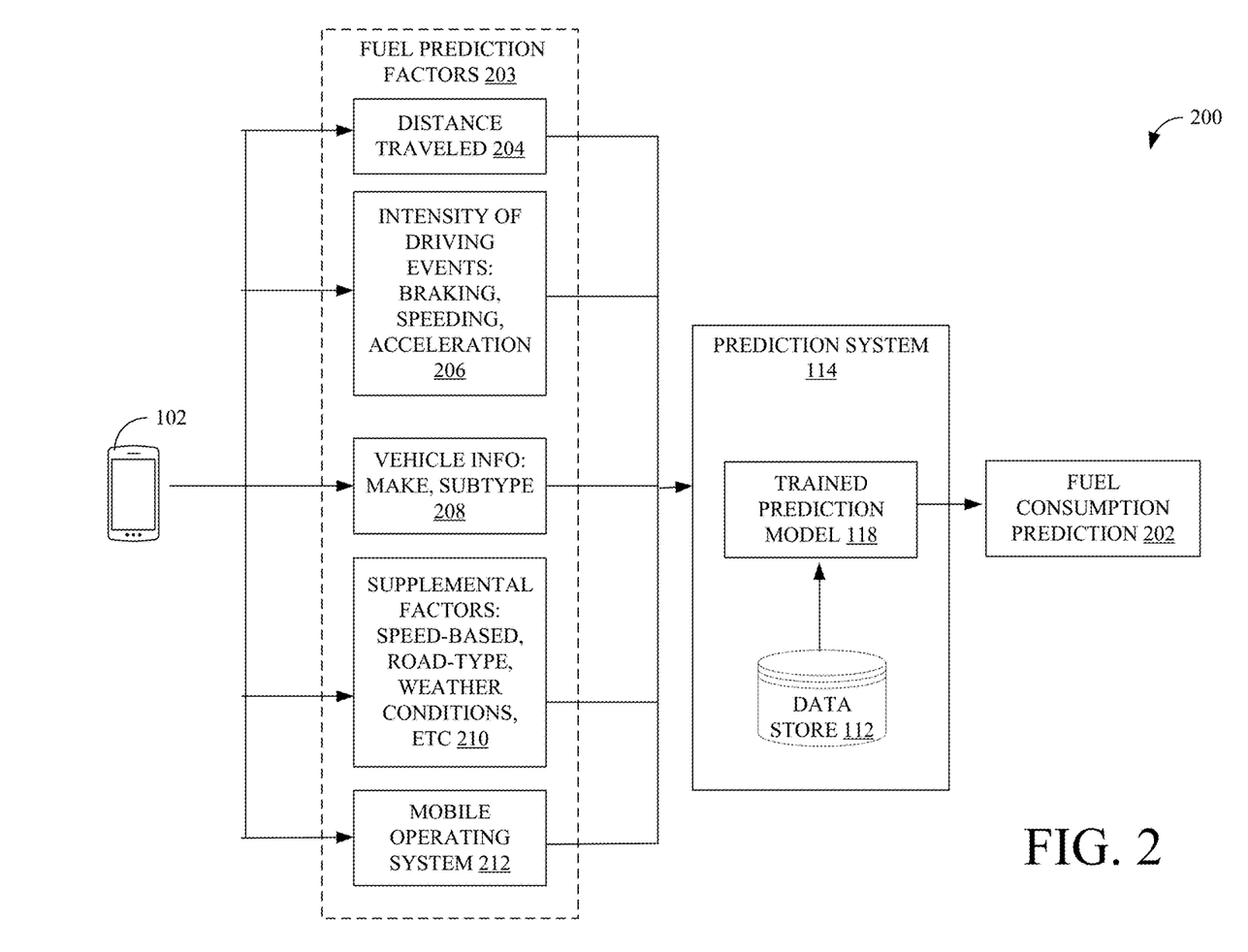
FIG. 2 illustrates an example diagram showing various factors used for determining a predicted fuel consumption based on mobile device sensor data.

Turning to FIG. 2, the illustrated example diagram 200 shows various fuel prediction factors 203 used for determining a fuel consumption prediction 202. The fuel consumption prediction 202 may be calculated based on a distance traveled 204 as a baseline, and the distance traveled 204 may be determined based on global position system (GPS) data. In addition, the driving events 110 and associated intensities 206 may also be used as input.

The driving events 110 may include braking, speeding, and acceleration events. There may be a number of different intensity levels of breaking events separated into breaking event buckets associated with a distinct intensity range. For example, there may be three different kinds of breaking events: low-intensity breaking events, medium-intensity breaking events, and high-intensity break events.

There may be a number of different intensity levels of acceleration events separated into acceleration event buckets associated with a distinct intensity range. For example, there may be three different kinds of acceleration events: low-intensity, medium-intensity, and high-intensity acceleration.

With respect to speeding, the length in which the speeding occurs may be determined and classified. Speeding may be calculated at a speed above the designated speed limits of the road driven on, which may be extrapolated from GPS data or other third-party application data. For example, there may be three different kinds of speeding events: short speeding events, medium-range speeding events, and long speeding events.

In addition, a vehicle make and/or subtype 208 may further modify the fuel consumption prediction 202. Each vehicle make and/or subtype 208 may be associated with a coefficient, stored in the data store 112. A vehicle type may differentiate between hybrids, trucks, and everything else. When the training prediction model 118 is a linear regression type model whereby, depending on the vehicle make and/or subtype 208, the coefficient may be different in order to calibrate the model to more accurately predict based on the vehicle make and/or subtype 208.

Furthermore, other supplemental factors 210 may be included to calculate the fuel consumption prediction 202 more accurately. For example, the other supplemental factors 208 may be speed-based factors, road-type factors, weather condition factors, and/or elevation factors. With respect to speed-based factors, while the speeding events only cover speeding above the designated speed limit or some other speed threshold, speeds lower than the designated speed limits may also attribute to the fuel consumption prediction 202. As such, the prediction system 114 may take into account speed at various intervals, collecting speed data points, wherein the collected speed data points through the distance traveled 204 are used to generate the fuel consumption prediction 202. Each vehicle make and/or subtype 208 has its own speed at which the vehicle is most fuel-efficient. Furthermore, maintaining a constant speed, as when using cruise control, can help improve fuel usage. These types of data points may further assist with more accurately determining the fuel consumption prediction 202.

With respect to road-type factors, certain road types, such as dirt roads or uneven pavement, may lead to inefficient fuel usage. Therefore, by taking the road type into account, the prediction system 114 may more accurately determine the fuel consumption prediction 202. For example, GPS may be used to determine road type by comparing with maps or MEMS sensors may be used by examining vibration patterns.

With respect to weather condition factors, poor weather, for example, may attribute to excess fuel waste in calculating the fuel consumption prediction 202. As such, the prediction system 114 may take weather conditions into account through the distance traveled 204, especially if poor conditions, such as snow, could significantly impact the fuel consumption prediction 202. For example, GPS location and timestamps may be used to infer weather conditions.

With respect to elevation factors, driving at an incline versus driving at a decline may also attribute to the fuel consumption prediction 202. Inclines and declines may affect how the vehicle 104 may need to accelerate or decelerate. Furthermore, higher altitude also leads to lower fuel consumption, which means an overall fuel-per-mile efficiency is increased at higher elevation. Therefore, the prediction system 114 may take elevation/incline/decline factors into account through the distance traveled 204. For example, GPS data may include altitude information.

Lastly, a mobile operating system 212 of the mobile device 102 may further modify fuel consumption prediction 202. For example, a distinction may be made between Android, iOS, and others because data collection is slightly different across the platforms, wherein one platform may catch an event while another may not. Therefore, the mobile operation system 212 may be considered to avoid under- or over-calculating. As such, the trained prediction model 108 may output the fuel consumption prediction 202 based on the above-listed factors.

Figure 3:
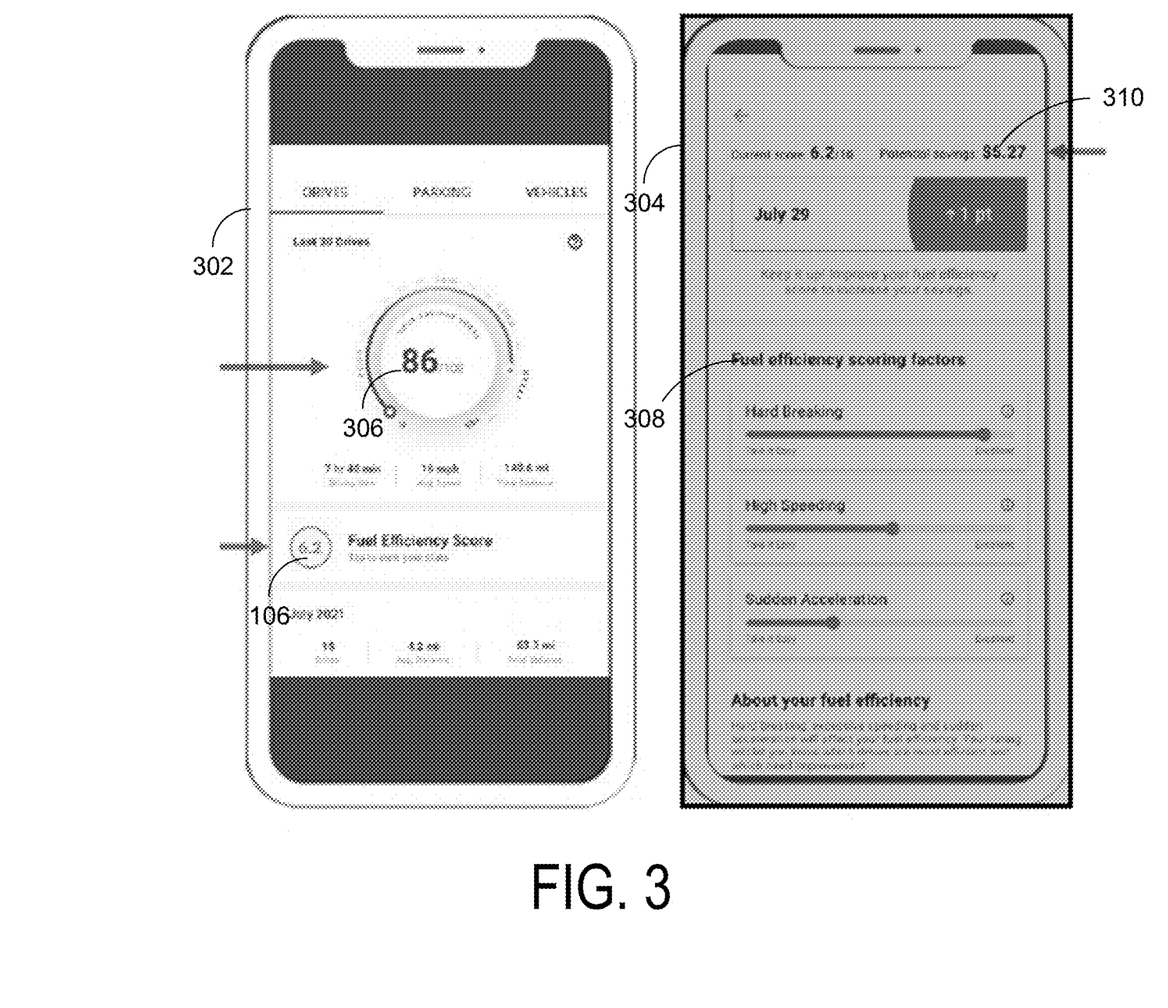
FIG. 3 illustrates an example graphical user interface (GUI) of a user device showing a fuel efficiency score, a fuel wasted prediction, and a user efficiency score.

FIG. 3 illustrates an example graphical user interface (GUI) of a mobile application on the mobile device 102 showing a fuel efficiency overview 302 and a detailed fuel efficiency trip view 304. For example, the fuel efficiency overview 302 and a detailed fuel efficiency trip view 304 can be presented using a GUI 403 (e.g., of a computing device 401 as discussed regarding FIG. 4). The mobile application may cause to display in the GUI, the fuel efficiency score 106 of a last trip. The mobile application may cause to further display a user efficiency score 306, which may be a calculated aggregate of past fuel efficiency scores 106, either of a past period of time, such as past days, or of all time. The user efficiency score 306 may be compared with user efficiency scores associated with a set of other users based on a common characteristic, such as, geographical location, age, etc.

The user efficiency score 306 may allude to the user's driving habits over time, providing the user with a general understanding of how much room for improvement the user has in obtaining an excellent fuel efficiency score. The detailed fuel efficiency trip view 304 may also display a potential fuel savings 310 calculated based on the fuel efficiency score 106, the fuel consumption prediction 202, and a determined fuel cost. In aiming for a better fuel efficiency score, the user may use the information from the mobile application to lower an amount of potential pending in fuel cost 306 for future drives. The potential savings in fuel cost 310 may be displayed by the mobile application for a past trip and/or for a period of time.

The mobile application may further cause to display a more comprehensive analysis of a past trip by scoring particular aspects of the past trip. For example, each fuel efficiency scoring factor 308, such as hard breaking, high speeding, or sudden acceleration may be analyzed. The duration, intensity, and/or quantity of these driving events 110 may each have an effect on the fuel efficiency score 106. However, by breaking down the fuel efficiency score 106 into the fuel efficiency scoring factors 308, the user may better understand how to improve their driving. In some cases, a visual map of the trip may be displayed and where these instances occur may be displayed along the trip route so the user can better recall where and when those driving events occurred. Furthermore, if a pattern occurs with respect to particular driving events at particular locations, the mobile application may cause to display such information.

For determining driving events for vehicles that may operate in an autonomous mode, the mobile application may receive an indication based on an input from the user that the vehicle is operating in the autonomous mode for part of all of a trip. A comparison may be made between driving events that occur during manual driving and driving events that occur during autonomous mode. Fuel consumption and waste calculated for trips with autonomous mode may be used further to calibrate calculations of the fuel efficiency score 106.

Figure 4:
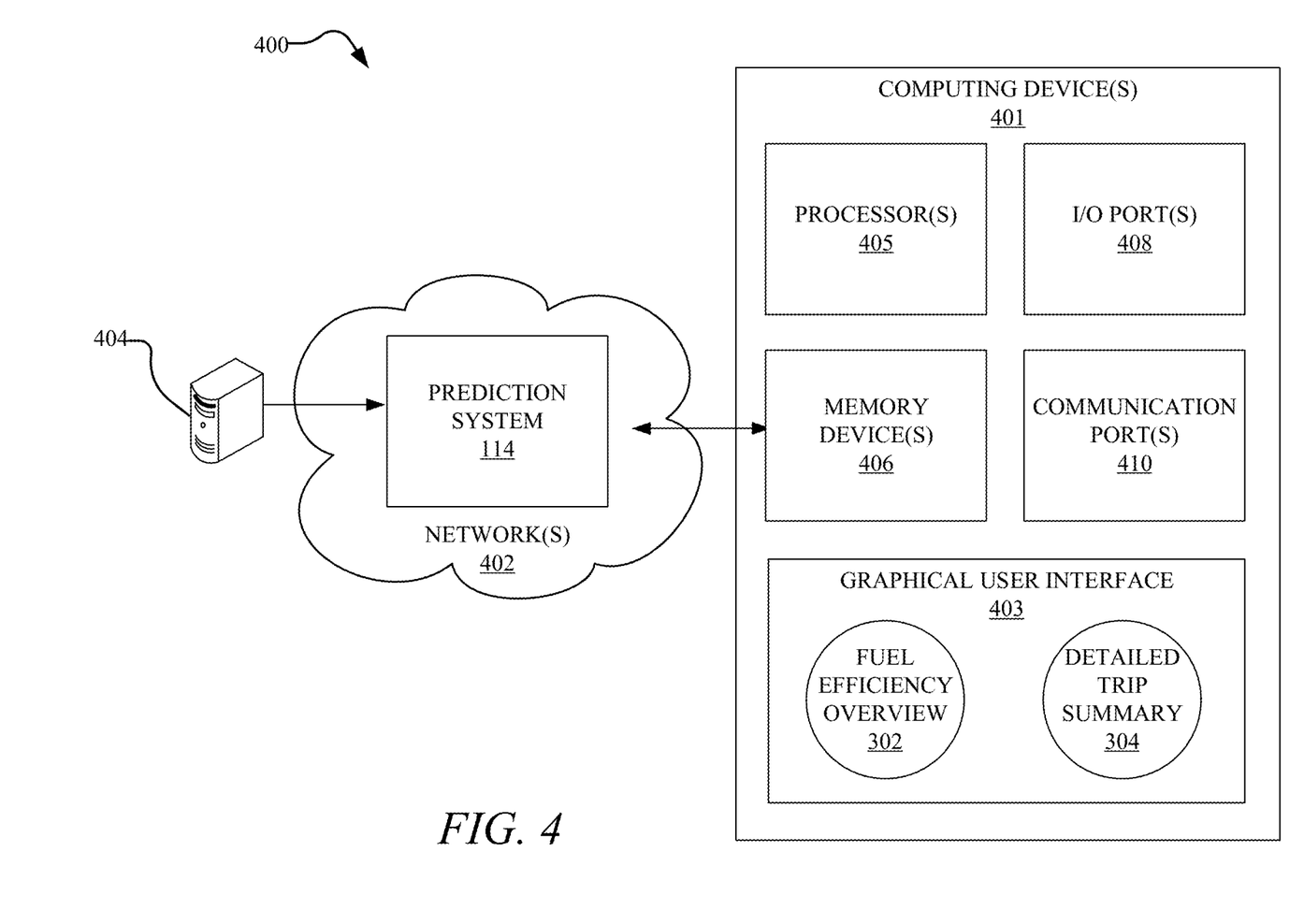
FIG. 4 illustrates an example network environment with one or more computing devices for determining fuel efficiency based on mobile device sensor data.

FIG. 4 illustrates an example network environment 400 with one or more computing devices for determining fuel efficiency based on mobile device sensor data. The example network environment 400 includes the one or more network(s) 402 which can be a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, the network(s) 402 can include any type of network, such as the Internet, an intranet, a Virtual Private Network (VPN), a Voice over Internet Protocol (VoIP) network, a wireless network (e.g., Bluetooth), a cellular network, a satellite network, combinations thereof, etc. The network(s) 402 provide access to and interactions with systems determining fuel efficiency based on mobile device sensor data. The network(s) 402 can include communications network components such as, but not limited to gateways routers, servers, and registrars, which enable communication across the network(s) 402. In one implementation, the communications network components include multiple ingress/egress routers, which may have one or more ports, in communication with the network(s) 402. Communication via any of the networks can be wired, wireless, or any combination thereof.

The network environment 400 may also include at least one server device 404 hosting software, application(s), web sites, and the like for operating the prediction system 114 for determining fuel efficiency based on mobile device sensor data. The prediction system 114 can receive inputs from various computing devices and transform the received input data into other unique types of data. The server(s) 404 may be a single server, a plurality of servers with each such server being a physical server or a virtual machine, or a collection of both physical servers and virtual machines. In another implementation, a cloud hosts one or more components of the systems 100-200. The server(s) 404 may represent an instance among large instances of application servers in a cloud computing environment, a data center, or other computing environment. The server(s) 404 can access data stored at one or more database(s) (e.g., including any of the values or identifiers discussed herein). The systems 100-1000, the server(s) 404, and/or other resources connected to the network(s) 402 may access one or more other servers to access other websites, applications, web services interfaces, GUIs, storage devices, APIs, computing devices, or the like to perform the techniques discussed herein. The server(s) can include one or more computing device(s) 401, as discussed in greater detail below.

For instance, the network environment 400 can include the one or more computing device(s) 401 for executing the prediction system 114 and/or determining fuel efficiency based on mobile device sensor data. In one implementation, the one or more computing device(s) 401 include the one or more server device(s) 404 executing the prediction system 114 as a software application and/or a module or algorithmic component of software.

In some instances, the computing device(s) 401 can include a computer, a personal computer, a desktop computer, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 401 may be integrated with, form a part of, or otherwise be associated with the systems 100-300. It will be appreciated that specific implementations of these devices may be of differing possible specific computing architectures not all of which are specifically discussed herein but will be understood by those of ordinary skill in the art.

The computing device 401 may be a computing system capable of executing a computer program product to execute a computer process. Data and program files may be input to the computing device 401, which reads the files and executes the programs therein. Some of the elements of the computing device 401 include one or more hardware processors 405, one or more memory devices 406, and/or one or more ports, such as input/output (IO) port(s) 408 and communication port(s) 410. Additionally, other elements that will be recognized by those skilled in the art may be included in the computing device 401 but are not explicitly depicted in FIG. 11 or discussed further herein. Various elements of the computing device 401 may communicate with one another by way of the communication port(s) 410 and/or one or more communication buses, point-to-point communication paths, or other communication means.

The processor 405 may include, for example, a central processing unit (CPU), a microprocessor, a microcontroller, a digital signal processor (DSP), and/or one or more internal levels of cache. There may be one or more processors 405, such that the processor 405 comprises a single central-processing unit, or a plurality of processing units capable of executing instructions and performing operations in parallel with each other, commonly referred to as a parallel processing environment.

The computing device 401 may be a conventional computer, a distributed computer, or any other type of computer, such as one or more external computers made available via a cloud computing architecture. The presently described technology is optionally implemented in software stored on the data storage device(s) such as the memory device(s) 406, and/or communicated via one or more of the I/O port(s) 408 and the communication port(s) 410, thereby transforming the computing device 401 in FIG. 4 to a special purpose machine for implementing the operations described herein and determining fuel efficiency based on mobile device sensor data. Moreover, the computing device 401, as implemented in the systems 100-300, receives various types of input data (e.g., in different data formats) and transforms the input data through the stages of the data flow described herein into new types of data files (e.g., the fuel efficiency score 106, the fuel consumption prediction 202). Moreover, these new data files are transformed to enable the computing device 401 to do something it could not do before—generate the fuel efficiency overview 302 and the detailed trip summary view 304 in the GUI 403.

The one or more memory device(s) 406 may include any non-volatile data storage device capable of storing data generated or employed within the computing device 401, such as computer executable instructions for performing a computer process, which may include instructions of both application programs and an operating system (OS) that manages the various components of the computing device 401. The memory device(s) 406 may include, without limitation, magnetic disk drives, optical disk drives, solid state drives (SSDs), flash drives, and the like. The memory device(s) 406 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 406 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 406 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 401 includes one or more ports, such as the I/O port(s) 408 and the communication port(s) 410, for communicating with other computing or network devices. It will be appreciated that the I/O port 408 and the communication port 410 may be combined or separate and that more or fewer ports may be included in the computing device 401.

The I/O port 408 may be connected to an I/O device, or other device, by which information is input to or output from the computing device 401. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 401 via the I/O port 408. Similarly, the output devices may convert electrical signals received from the computing device 401 via the I/O port 408 into signals that may be sensed as output by a human, such as sound, light, and/or touch. The input device may be an alphanumeric input device, including alphanumeric and other keys for communicating information and/or command selections to the processor 405 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 410 is connected to the network 402 so the computing device 401 can receive network data useful in executing the methods and systems set out herein as well as transmitting information and network configuration changes determined thereby. Stated differently, the communication port 410 connects the computing device 401 to one or more communication interface devices configured to transmit and/or receive information between the computing device 401 and other devices (e.g., network devices of the network(s) 402) by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 410 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 410 may communicate with an antenna or other link for electromagnetic signal transmission and/or reception.

In an example, the prediction system 114 and/or other software, modules, services, and operations discussed herein may be embodied by instructions stored on the memory devices 406 and executed by the processor 405.

The system set forth in FIG. 4 is but one possible example of a computing device 401 or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 401.

Figure 5:
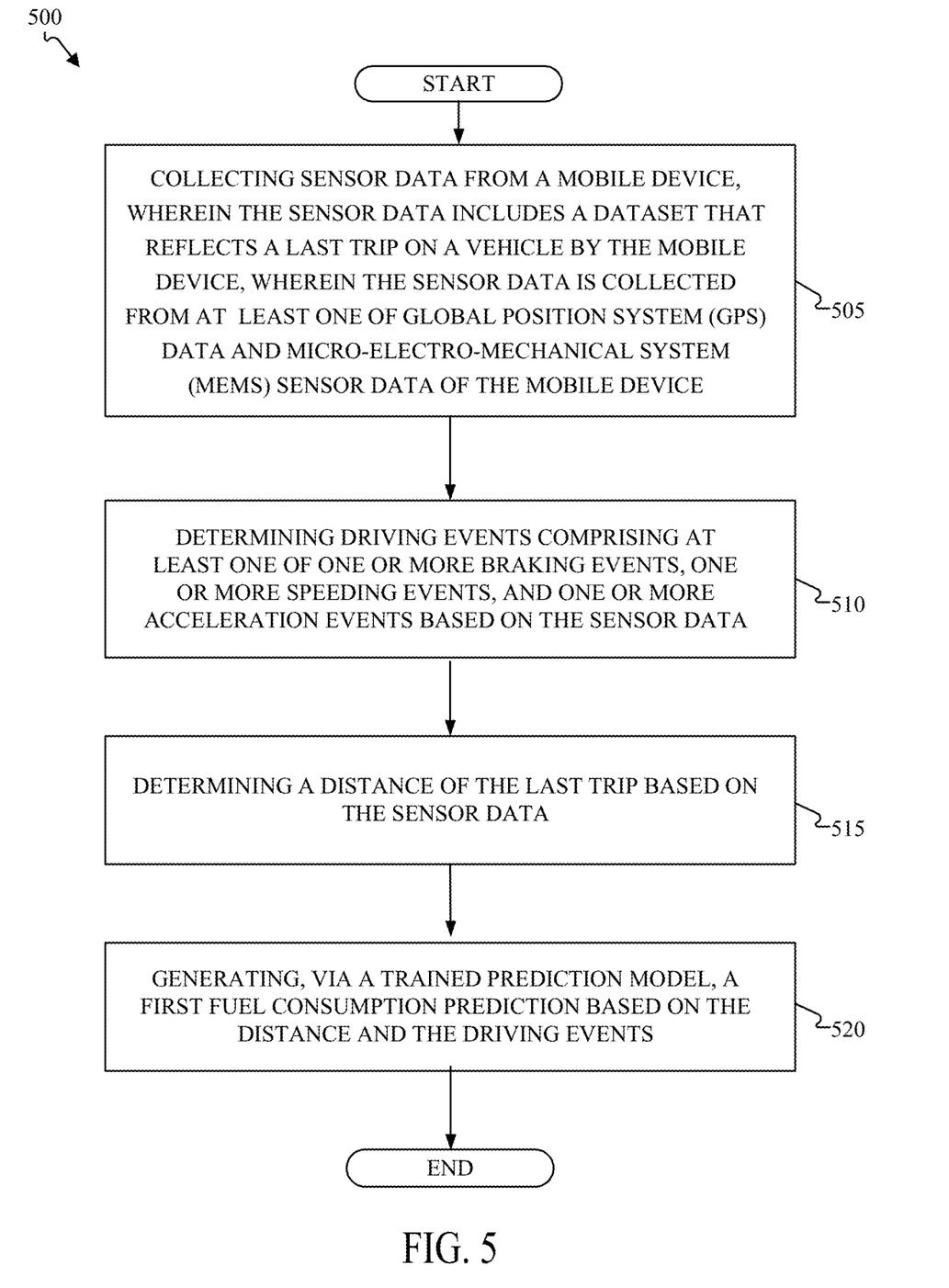
FIG. 5 illustrates example operations for determining fuel efficiency based on mobile device sensor data.

FIG. 5 depicts an example method 500 for determining fuel efficiency based on sensor data from a mobile device, which can be performed by any of the systems 100-300 and/or network environment 400. At operation 505, the method 500 collects sensor data from a mobile device, wherein the sensor data includes a dataset that reflects a last trip on a vehicle by the mobile device, wherein the sensor data is collected from at least one of global position system (GPS) data and micro-electro-mechanical system (MEMS) sensor data of the mobile device. At operation 510, the method 500 determines driving events comprising at least one of one or more braking events, one or more speeding events, and one or more acceleration events based on the sensor data. At operation 515, the method 500 determines a distance of the last trip based on the sensor data. At operation 520, the method 500 generates, via a trained prediction model, a first fuel consumption prediction based on the distance and the driving events.

The method 500 may further generate, via the trained prediction model, a second fuel consumption prediction based on the distance without the driving events. The method 500 may further calculate a fuel wasted prediction based on a difference between the first fuel consumption prediction and the second fuel consumption prediction. The method 500 may further determine fuel wasted per unit distance based on the fuel wasted prediction and the distance. The method 500 may further map the fuel wasted per unit distance to a distribution of a plurality of fuel wasted per unit distance data points based on a dataset of past trips for a plurality of users to set a plurality of thresholds. The method 500 may further determine a fuel efficiency score for the last trip based on one or more of the thresholds.

The method 500 may further determine a user efficiency score, wherein the user efficiency score is an accumulated or aggregated score based on past fuel efficiency scores of trips taken by a user associated with the mobile device in one or more vehicles. The method 500 may further determine a make and subtype of the vehicle based on stored data. The method 500 may further look up a coefficient associated with the make and subtype of the vehicle in a data store, wherein generating fuel consumption predictions, including the first fuel consumption prediction, accounts for the coefficient, wherein the coefficient is one of a plurality of coefficients associated with different makes and subtypes of vehicles stored in the data store.

The method 500 may further determine a mobile operation system of the mobile device, wherein the mobile operation system attributes to generating fuel consumption predictions, including the first fuel consumption prediction. The method 500 may further determine at least one of speed data points throughout the trip, wherein the at least one of speed data points throughout the trip attribute to the generating the first fuel consumption prediction. The method 500 may further determine one or more road types throughout the trip based on the GPS data, wherein the one or more road types throughout the trip attribute to the generating the first fuel consumption prediction. The method 500 may further determine weather conditions throughout the trip based on the GPS data and third-party data sourced via an application programming interface (API), wherein the weather conditions throughout the trip attribute to the generating the first fuel consumption prediction. The method 500 may further determine elevation throughout the trip based on the GPS data, wherein the elevation throughout the trip attributes to the generating the first fuel consumption prediction.

The method 500 may further calculate a cost of fuel waste based on the fuel wasted prediction. The method 500 may further receive the sensor data from the mobile device. The method 500 may further generate the first fuel consumption prediction at a cloud-based server. The method 500 may further send the first fuel consumption prediction to the mobile device.

Figure 6:
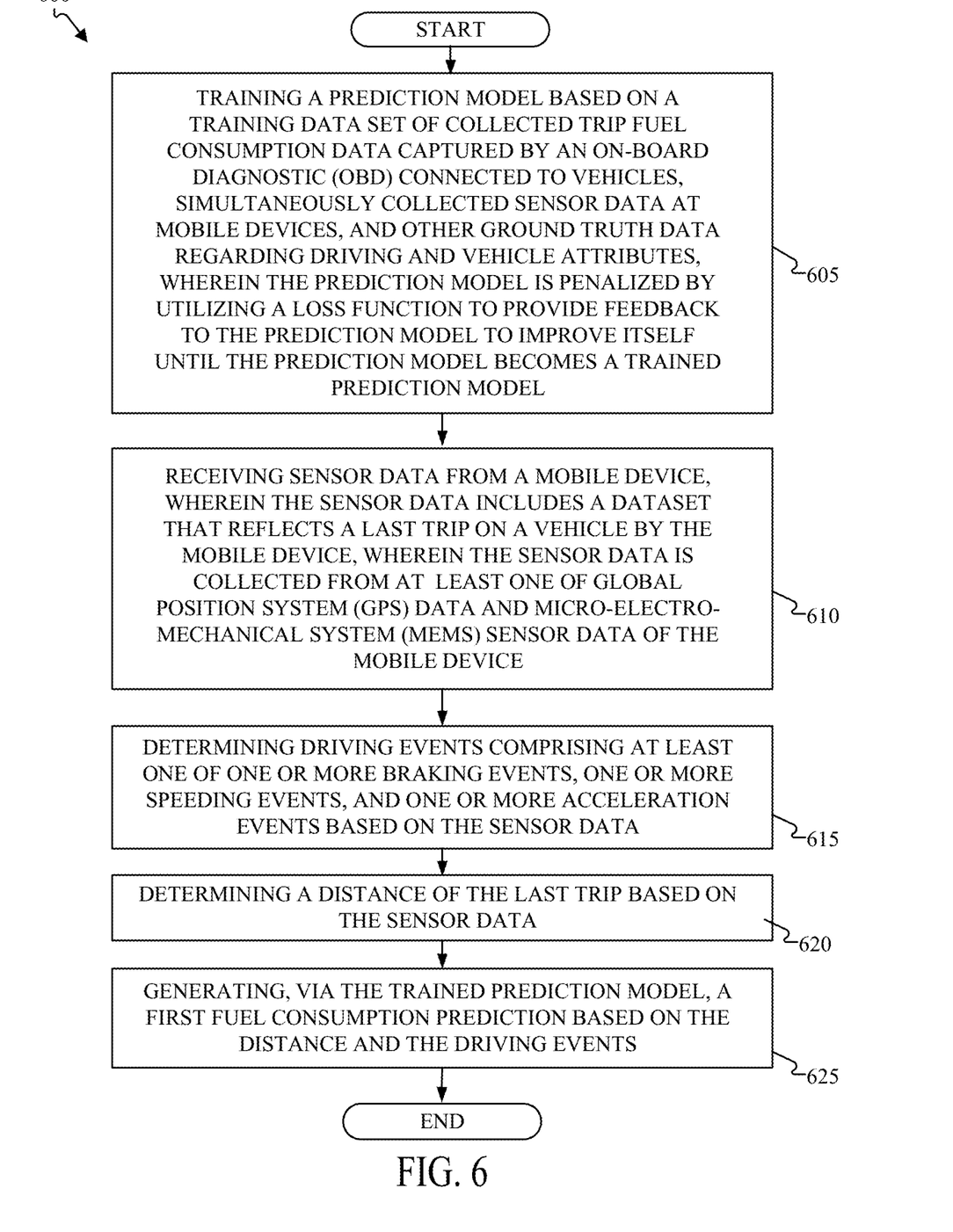
FIG. 6 illustrates example operations for determining a predicted fuel consumption based on mobile device sensor data.

FIG. 6 depicts an example method 600 for training a prediction model for determining fuel efficiency based on sensor data from a mobile device, which can be performed by any of the systems 100-300 and/or network environment 400. At operation 605, the method 600 trains a prediction model based on a training data set of collected trip fuel consumption data captured by an on-board diagnostic (OBD) connected to vehicles, simultaneously collected sensor data at mobile devices, and other ground truth data regarding driving and vehicle attributes, wherein parameters for the prediction model may be adjusted to improve the predictions until the prediction model becomes a trained prediction model. For example, the prediction model may be penalized by utilizing a loss function to provide feedback to the prediction model to improve itself until the prediction model becomes a trained prediction model.

At operation 610, the method 600 receives sensor data from a mobile device, wherein the sensor data includes a dataset that reflects a last trip on a vehicle by the mobile device, wherein the sensor data is collected from at least one of global position system (GPS) data and micro-electro-mechanical system (MEMS) sensor data of the mobile device. At operation 615, the method 600 determines driving events comprising at least one of one or more braking events, one or more speeding events, and one or more acceleration events based on the sensor data. At operation 620, the method 600 determines a distance of the last trip based on the sensor data. At operation 625, the method 600 generates, via a trained prediction model, a first fuel consumption prediction based on the distance and the driving events.

The method 600 may further determine an intensity of each of the one or more braking events. In some instances, the intensity is determined based on a deceleration over a period of time of each of the braking events. The method 600 may further classify each of the one or more braking events into one of two or more braking event buckets. In some cases, each braking event bucket is associated with a distinct intensity range. The method 600 may further determine an intensity of each of the one or more acceleration events. In some instances, the intensity is determined based on acceleration over a period of time of each of the acceleration events. The method 600 may further classify each of the one or more acceleration events into one of two or more acceleration event buckets. In some cases, each acceleration event bucket is associated with a distinct intensity range.

The method 600 may further determine a length of each of the one or more speeding events. The method 600 may further classify each of the one or more speeding events into one of two or more speeding event buckets. In some cases, each speeding event bucket is associated with a distinct length range. The method 600 may further determine a user efficiency score, wherein the user efficiency score is an accumulated or aggregated score based on past fuel efficiency scores of trips taken by a user associated with the mobile device in one or more vehicles. The method 600 may further compare the user efficiency score with user efficiency scores associated with a set of other users based on a common characteristic.

Figure 7:
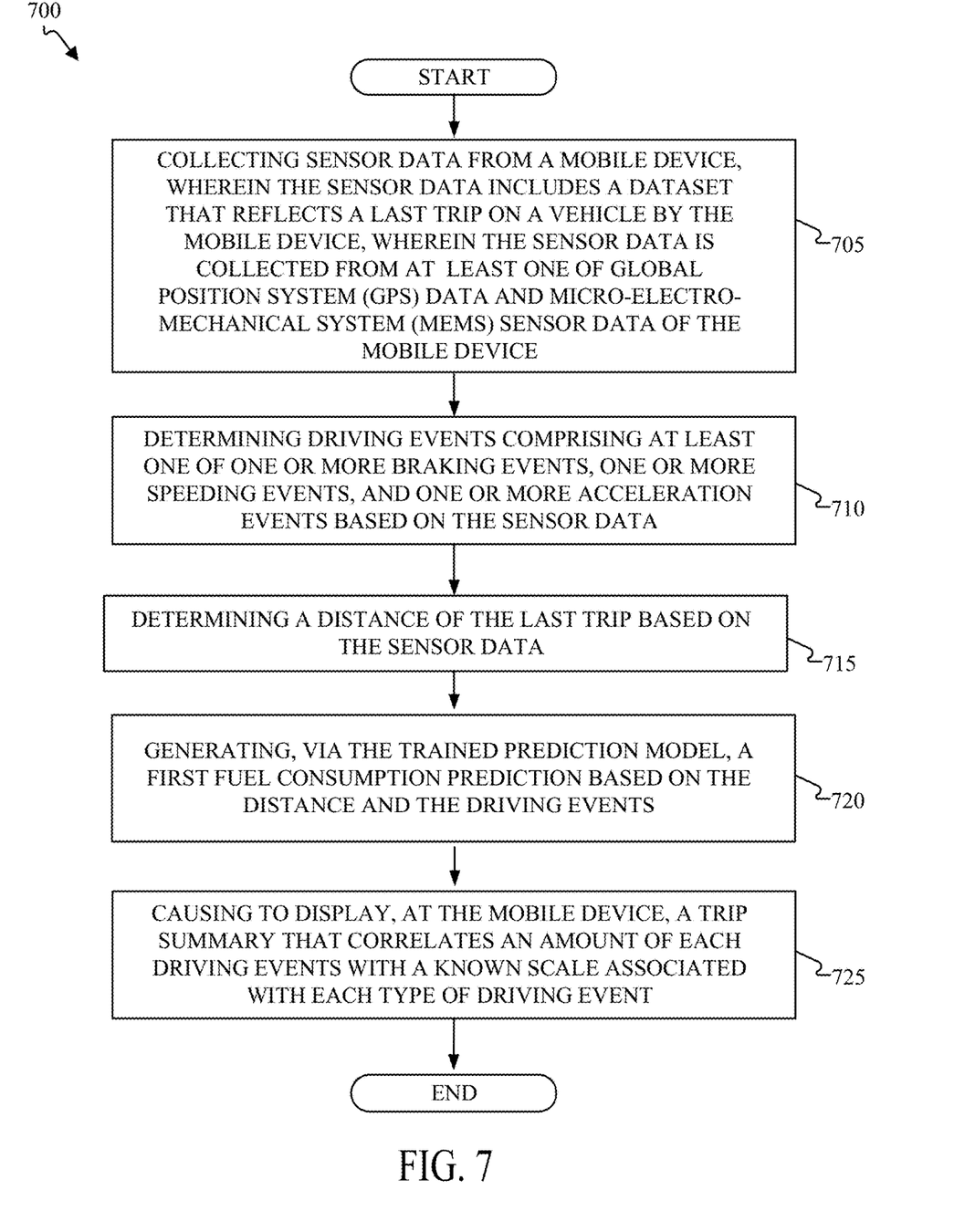
FIG. 7 illustrates example operations for determining a user efficiency score based on mobile device sensor data.

FIG. 7 depicts an example method 700 for determining fuel efficiency based on sensor data from a mobile device, which can be performed by any of the systems 100-300 and/or network environment 400. At operation 705, the method 700 collects sensor data from a mobile device, wherein the sensor data includes a dataset that reflects a last trip on a vehicle by the mobile device, wherein the sensor data is collected from at least one of global position system (GPS) data and micro-electro-mechanical system (MEMS) sensor data of the mobile device. At operation 710, the method 700 determines driving events comprising at least one of one or more braking events, one or more speeding events, and one or more acceleration events based on the sensor data. At operation 715, the method 700 determines a distance of the last trip based on the sensor data. At operation 720, the method 700 generates, via a trained prediction model, a first fuel consumption prediction based on the distance and the driving events. At operation 725, the method 700 causes to display, at the mobile device, a trip summary that correlates an amount of each driving events with a known scale associated with each type of driving event.

The method 700 may further cause to display, at the mobile device, a visualized trip summary indicating where along the trip that the one or more driving events took place. The method 700 may further receive an indication at the mobile device that the vehicle is being driven in an autonomous mode. The method 700 may further classify driving events captured during which the vehicle is being driven in the autonomous mode separately. The method 700 may further generate a second fuel consumption prediction based on the distance driven in the autonomous mode and the driving events captured during the autonomous mode. The method 700 may further compare the first fuel consumption prediction with the second fuel consumption prediction.

It is to be understood that the specific order or hierarchy of operations in the methods depicted in FIGS. 5-7 and throughout this disclosure are instances of example approaches and can be rearranged while remaining within the disclosed subject matter. For instance, any of the operations depicted in FIGS. 5-7 may be omitted, repeated, performed in parallel, performed in a different order, and/or combined with any other of the operations depicted in FIGS. 5-7 or discussed herein.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Furthermore, any term of degree such as, but not limited to, "substantially," as used in the description and the appended claims, should be understood to include an exact, or a similar, but not exact configuration. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method for determining vehicle fuel efficiency, the method comprising:
   training a prediction model based on a training data set of collected trip fuel consumption data and other ground truth data regarding driving and vehicle attributes, wherein the prediction model is penalized by utilizing a loss function to provide feedback to the prediction model to improve the prediction model until the trained prediction model is generated;
   collecting sensor data from a mobile device, wherein the sensor data includes a dataset that reflects a last trip on a vehicle by the mobile device, wherein the sensor data is collected from global position system (GPS) sensor data and micro-electro-mechanical system (MEMS) sensor data of the mobile device;
   determining patterns of driving events at one or more particular locations comprising at least one of one or more braking events, one or more speeding events, and one or more acceleration events based on the GPS sensor data and historical driving events;
   determining a distance of the last trip based on the sensor data;
   generating, via the trained prediction model, a first fuel consumption prediction based on the distance, the driving events, and the mobile operation system of the mobile device; and
   generating a user interface that includes a visual map of the last trip including highlights of locations associated with instances of the driving events of the determined patterns, a fuel efficiency score indicative of an amount of wasted fuel on the last trip, and one or more fuel efficiency score factors associated with the at least one of the one or more braking events, the one or more speeding events, and the one or more acceleration events indicative of an amount by which these factors contributed to the fuel efficiency score.

2. The method of claim 1, further comprising:
   generating, via the trained prediction model, a second fuel consumption prediction based on the distance without the driving events; and
   calculating a fuel wasted prediction based on a difference between the first fuel consumption prediction and the second fuel consumption prediction.

3. The method of claim 2, further comprising:
   determining fuel wasted per unit distance based on the fuel wasted prediction and the distance;
   mapping the fuel wasted per unit distance to a distribution of a plurality of fuel wasted per unit distance data points based on a dataset of past trips for a plurality of users to set a plurality of thresholds; and
   determining the fuel efficiency score for the last trip based on one or more of the thresholds.

4. The method of claim 3, further comprising:
   determining a user efficiency score, wherein the user efficiency score is an accumulated score based on past fuel efficiency scores of trips taken by a user associated with the mobile device in one or more vehicles.

5. The method of claim 2, further comprising:
   determining a make and subtype of the vehicle based on stored data; and
   looking up a coefficient associated with the make and subtype of the vehicle in a data store, wherein the generating the first fuel consumption prediction accounts for the coefficient, wherein the coefficient is one of a plurality of coefficients associated with different makes and subtypes of vehicles stored in the data store.

6. The method of claim 2, further comprising:
   determining at least one of speed data points throughout the trip,
   wherein the generating the first fuel consumption prediction accounts for the speed data points throughout the trip.

7. The method of claim 2, further comprising:
   determining road type throughout the trip based on the GPS data,
   wherein the generating the first fuel consumption prediction accounts for the road type throughout the trip.

8. The method of claim 2, further comprising:
   determining weather conditions throughout the trip based on the GPS data and third-party data sourced via an application programming interface (API),
   wherein the generating the first fuel consumption prediction is based, in part, on the weather conditions throughout the trip.

9. The method of claim 2, further comprising:
   determining elevation throughout the trip based on the GPS data,
   wherein the generating the first fuel consumption prediction is based, in part, on the elevation throughout the trip.

10. The method of claim 2, further comprising:
    calculating a cost of fuel waste based on the fuel wasted prediction.

11. The method of claim 2, further comprising:
    receiving the sensor data from the mobile device;
    generating the first fuel consumption prediction at a cloud-based server; and
    sending the first fuel consumption prediction to the mobile device.

12. A system for determining vehicle fuel efficiency based on a trained prediction model, the system comprising:
  at least one processor configured to:
    train a prediction model based on a training data set of collected trip fuel consumption data and other ground truth data regarding driving and vehicle attributes, wherein the prediction model is penalized by utilizing a loss function to provide feedback to the prediction model to improve the prediction model until the trained prediction model is generated;
    receive sensor data from a mobile device, wherein the sensor data includes a dataset that reflects a last trip on a vehicle by the mobile device, wherein the sensor data is collected from global position system (GPS) sensor data and micro-electro-mechanical system (MEMS) sensor data of the mobile device;
    determine patterns of driving events at one or more particular locations comprising at least one of one or more braking events, one or more speeding events, and one or more acceleration events based on the GPS sensor data and historical driving events;
    determine a distance of the last trip based on the sensor data;
    generate, via the trained prediction model, a first fuel consumption prediction based on the distance, the driving events, and the mobile operation system of the mobile device; and
    generate a user interface that includes a visual map of the last trip including highlights of locations associated with instances of the driving events of the determined patterns, a fuel efficiency score indicative of an amount of wasted fuel on the last trip, and one or more fuel efficiency score factors associated with the at least one of the one or more braking events, the one or more speeding events, and the one or more acceleration events indicative of an amount by which these factors contributed to the fuel efficiency score.

13. The system of claim 12, wherein the at least one processor is further configured to:
  determine an intensity of each of the one or more braking events, wherein the intensity is determined based on a deceleration over a period of time of each of the braking events; and
  classify each of the one or more braking events into one of two or more braking event buckets, wherein each braking event bucket is associated with a distinct intensity range.

14. The system of claim 12, wherein the at least one processor is further configured to:
  determine an intensity of each of the one or more acceleration events, wherein the intensity is determined based on acceleration over a period of time of each of the braking events; and
  classify each of the one or more braking events into one of two or more braking event buckets, wherein each braking event bucket is associated with a distinct intensity range.

15. The system of claim 12, wherein the at least one processor is further configured to:
  determine a length of each of the one or more speeding events; and
  classify each of the one or more speeding events into one of two or more speeding event buckets, wherein each speeding event bucket is associated with a distinct length range.

16. The system of claim 12, wherein the at least one processor is further configured to:
  determine a user efficiency score, wherein the user efficiency score is an accumulated score based on past fuel efficiency scores of trips taken by a user associated with the mobile device in one or more vehicles; and
  compare the user efficiency score with user efficiency scores associated with a set of other users based on a common characteristic.

17. One or more tangible non-transitory computer-readable storage media storing computer-executable instructions for performing a computer process on a computing system, the computer process comprising:
  training a prediction model based on a training data set of collected trip fuel consumption data and other ground truth data regarding driving and vehicle attributes, wherein the prediction model is penalized by utilizing a loss function to provide feedback to the prediction model to improve the prediction model until the trained prediction model is generated;
  collecting sensor data from a mobile device, wherein the sensor data includes a dataset that reflects a last trip on a vehicle by the mobile device, wherein the sensor data is collected from global position system (GPS) sensor data and micro-electro-mechanical system (MEMS) sensor data of the mobile device;
  determining patterns of driving events at one or more particular locations comprising at least one of one or more braking events, one or more speeding events, and one or more acceleration events based on the GPS sensor data and historical driving events;
  determining a distance of the last trip based on the sensor data;
  generating, via the trained prediction model, a first fuel consumption prediction based on the distance, the driving events, and the mobile operation system of the mobile device;
  causing to display, at the mobile device, a trip summary that correlates an amount of each driving event with a known scale associated with each type of driving event; and
  generating a user interface that includes a visual map of the last trip including highlights of locations associated with instances of the driving events of the determined patterns, a fuel efficiency score indicative of an amount of wasted fuel on the last trip, and one or more fuel efficiency score factors associated with the at least one of the one or more braking events, the one or more speeding events, and the one or more acceleration events indicative of an amount by which these factors contributed to the fuel efficiency score.

18. The one or more tangible non-transitory computer-readable storage media of claim 17, the computer process further comprising:
  receiving an indication at the mobile device that the vehicle is being driven in an autonomous mode;
  classifying driving events captured during which the vehicle is being driven in the autonomous mode separately;
  generating a second fuel consumption prediction based on the distance driven in the autonomous mode and the driving events captured during the autonomous mode; and
  comparing the first fuel consumption prediction with the second fuel consumption prediction.

\* \* \* \* \*